United States Patent [19]
Besson

[11] Patent Number: 5,764,720
[45] Date of Patent: Jun. 9, 1998

[54] METHODS AND APPARATUS FOR SIMPLIFIED PRE-PROCESSING OF DATA IN A COMPUTED TOMOGRAPHY SYSTEM

[75] Inventor: Guy M. Besson, Wauwatosa, Wis.

[73] Assignee: General Electric Company, Milwaukee, Wis.

[21] Appl. No.: 772,548

[22] Filed: Dec. 26, 1996

[51] Int. Cl.$^6$ .................................................... A61B 6/03
[52] U.S. Cl. ................................................ 378/4; 378/901
[58] Field of Search ........................................ 378/4, 901

[56] References Cited

U.S. PATENT DOCUMENTS 5,559,846  9/1996  Tam ............................................. 378/4

Primary Examiner—David P. Porta
Assistant Examiner—David Vernon Bruce
Attorney, Agent, or Firm—John S. Beulick; John H. Pilarski

[57] ABSTRACT

The present invention, in one embodiment, is a system for performing image reconstruction from raw projection data acquired in a tomographic scan. More specifically, the system implements an estimation algorithm for raw projection data which does not require fully pre-processing all raw projection data for image reconstruction. Particularly, raw projection for a base view is pre-processed to generate pre-processed projection data for the base view. A linear calibration algorithm generates a linearization vector using at least a portion of the fully pre-processed projection data for the base view. The linearization vector is then applied to raw projection data for subsequent views to generate estimated pre-processed projection data for such subsequent views.

20 Claims, 2 Drawing Sheets

1

METHODS AND APPARATUS FOR SIMPLIFIED PRE-PROCESSING OF DATA IN A COMPUTED TOMOGRAPHY SYSTEM

FIELD OF THE INVENTION

This invention relates generally to computed tomography (CT) imaging and more particularly, to simplifying the pre-processing of data in a CT system.

BACKGROUND OF THE INVENTION

In at least one known CT system configuration, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles during one revolution of the x-ray source and detector. In an axial scan, the projection data is processed to construct an image that corresponds to a two dimensional slice taken through the object. One method for reconstructing an image from a set of projection data is referred to in the art as the filtered back projection technique. This process converts the attenuation measurements from a scan into integers called "CT numbers" or "Hounsfield units", which are used to control the brightness of a corresponding pixel on a cathode ray tube display.

To reduce the total scan time required for multiple slices, a "helical" scan may be performed. To perform a "helical" scan, the patient is moved in the z-axis synchronously with the rotation of the gantry, while the data for the prescribed number of slices is acquired. Such a system generates a single helix from a fan beam helical scan. The helix mapped out by the fan beam yields projection data from which images in each prescribed slice may be reconstructed.

Reconstruction algorithms for helical scanning typically use helical weighting ("HW") algorithms which weight the collected data as a function of view angle and detector channel index. Specifically, prior to filtered back projection, the data is weighted according to a helical weighting factor, which is a function of both the view angle and detector angle. Particularly, projection data is filtered, weighted, and back projected to generate each image.

In known CT systems, "raw" projection data for each view are pre-processed to generate "fully pre-processed" projection data. Known pre-processing calibration steps include a −log operation and, before applying such operation, performing QCAL (e.g., calibrating the x-ray position in the z-axis), Theta-Fix, XCAL (e.g., cross talk correction), air calibration and matrix deconvolution. After the −log operation, additional pre-processing steps include x-ray beam hardening and z-slope correction. Each pre-processing step is complex and requires significant computational time and costs.

Image reconstruction time, i.e., the time required to scan and reconstruct images, is related to system pre-processing. Particularly, by reducing system pre-processing, the image reconstruction time would be shortened. Until now, is was believed that reducing or eliminating any pre-processing would significantly degrade image quality.

It would be desirable to decrease image reconstruction time in a CT system by reducing raw projection data pre-processing steps. It also would be desirable to decrease reconstruction time without significantly degrading overall image quality, and without requiring significant cost increases in known CT systems. It further would be desirable to reduce the costs and time required to pre-process raw projection data.

SUMMARY OF THE INVENTION

These and other objects may be attained in a system which, in one embodiment, implements an estimation algorithm for raw projection data which does not require fully pre-processing all raw projection data for image reconstruction. Particularly, and in accordance with one embodiment of the present invention, raw projection data for a base view is pre-processed to generate fully pre-processed projection data for the base view. At least a portion of the fully pre-processed projection data for the base view is then used to estimate pre-processed projection data for subsequent views. More specifically, the pre-processed projection data and the raw projection data for the base view are used to generate a linearization factor. A linear calibration algorithm then applies the linearization factor to raw projection data for the subsequent views to estimate pre-processed projection data for such subsequent views.

Using the estimation algorithm described above decreases the processing time and enables raw projection data for views to be pre-processed without requiring that raw projection data for each view be independently fully pre-processed. Further, the computational costs and expenses of reconstructed images are reduced. Such algorithm also decreases the processing time and is not believed to significantly decrease image quality.

DETAILED DESCRIPTION OF THE DRAWINGS

Figure 1:
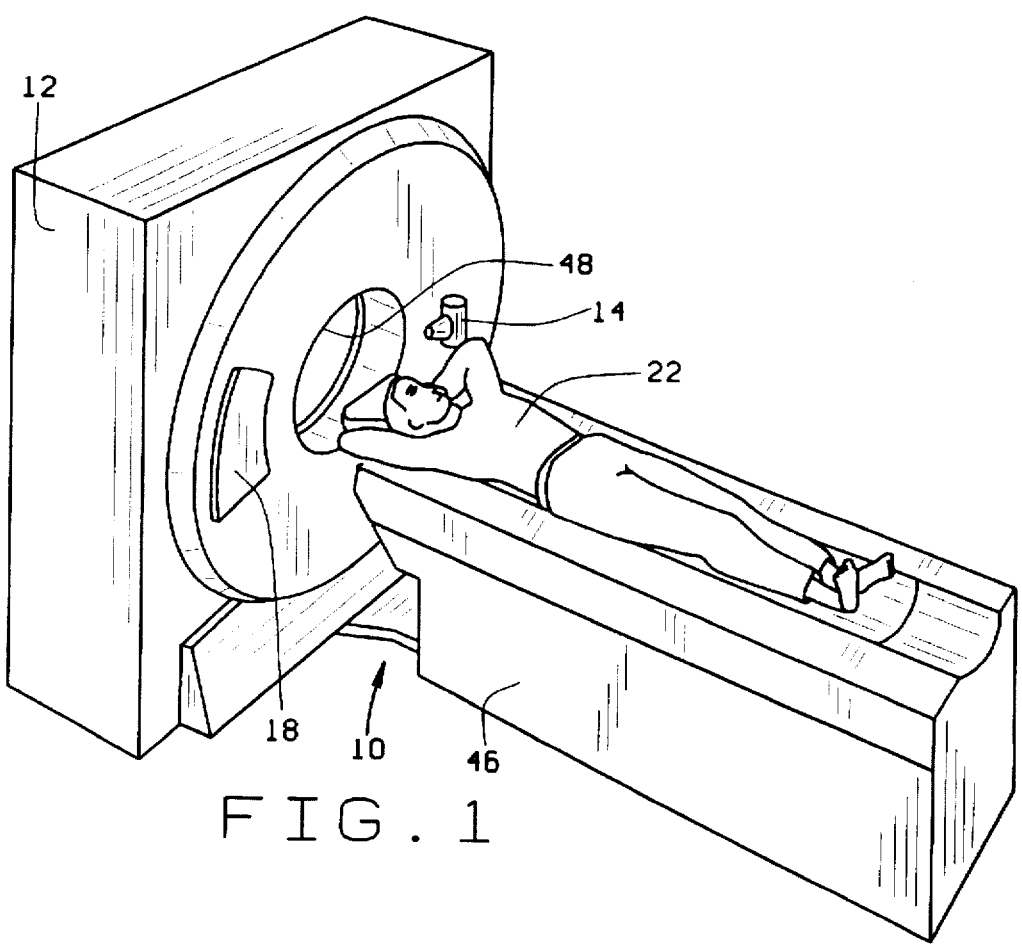
FIG. 1 is a pictorial view of a CT imaging system.
Figure 2:
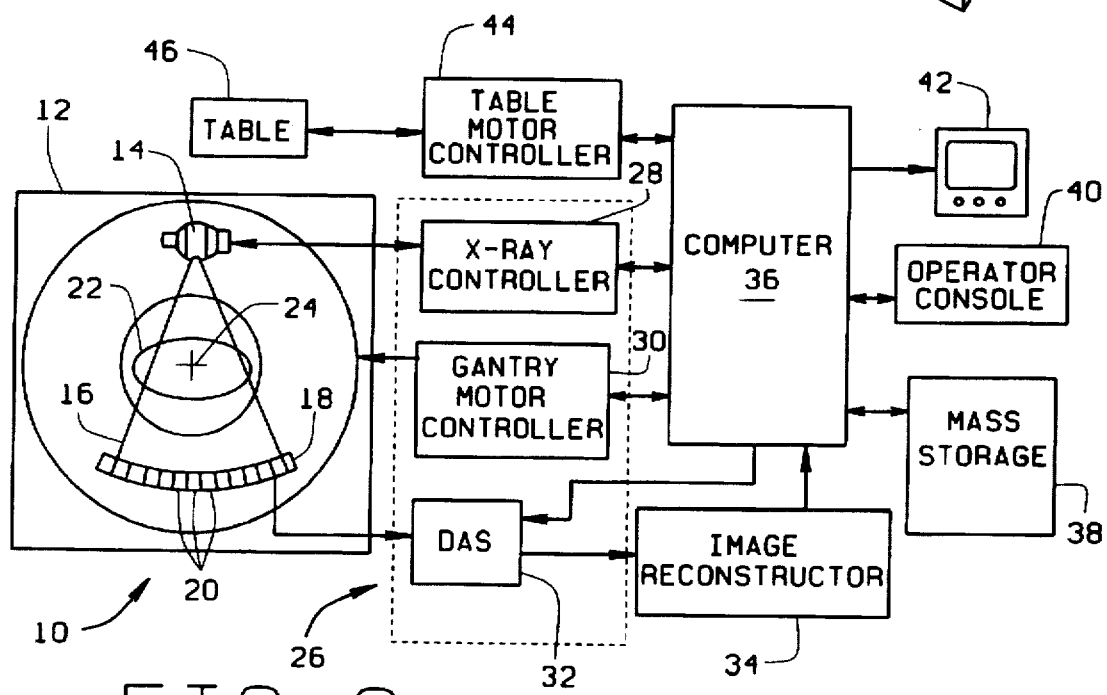
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through a medical patient 22. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46, or patient table, to position patient 22 in gantry 12. Particularly, table 46 moves portions of patient 22 through gantry opening 48. Gantry opening 48 is sometimes referred to herein as the gantry bore.

Raw projection data typically is pre-processed when reconstructing an image. Known pre-processing steps require QCAL (calibrating the x-ray position along detector 18 in the z-direction), Theta-Fix, XCAL (correcting cross talk between adjacent detector cell 20 outputs), air calibration and matrix deconvolution. As described above, preprocessing raw projection data for each view is time consuming and complex.

The following discussion of an estimation algorithm sometimes refers specifically to CT systems using an axial scan. The estimation algorithm, however, is not limited to practice in connection with such systems, and may be used with other CT systems, such as helical scan CT systems, dynamic CT systems and CT Fluoro systems. Further, in one embodiment, the estimation algorithm would be implemented in computer 36 and would process, for example, data stored in mass storage 38. Many other alternative implementations are, of course, possible.

In accordance with one embodiment, an estimation algorithm is applied to raw projection data to generate pre-processed projection data without fully pre-processing such raw projection data. Specifically, a full image quality scan is performed, as is known, to acquire raw projection data of patient 22 or an object of interest. The raw projection data for a base view of the object of interest is pre-processed in accordance with known pre-processing techniques to generate fully pre-processed projection data for such base view. At least a portion of the pre-processed projection data for the base view is then used to pre-process raw projection data for subsequent views.

More specifically, and rather than fully pre-processing raw projection data for a subsequent view, a linear calibration algorithm is applied to raw projection data for the subsequent view to generate estimated pre-processed projection data for such view. As a specific example, and considering only one channel of CT system 10, assume $I_1$ is a projection value of the raw projection data for the base view, and assume $\hat{I}_1$ is a projection value of the fully pre-processed projection data for the base view. Pre-processed projection data for a subsequent, or second, view may be estimated in accordance with:

$$\hat{I}_2 = \frac{\hat{I}_1}{I_1} * I_2, \quad (1)$$

where:

$I_2$ is a projection value of the raw projection data for the subsequent view;

$\hat{I}_2$ is a projection value of the estimated pre-processed projection data for the subsequent view; and $\hat{I}_1/I_1$ is a linearization factor.

Accordingly, pre-processed projection data $\hat{I}_2$ for a subsequent view may be determined without fully pre-processing raw projection data $I_2$ for such view. Pre-processed projection data for the same channel in still subsequent views $\hat{I}_3$, $\hat{I}_4$, ... $\hat{I}_n$ similarly are estimated.

The linear calibration algorithm, while described above with respect to only one channel, applies to all detector channels. Accordingly, and rather than applying a linearization factor, the linear calibration algorithm applies a linearization vector $\{\hat{I}_1/I_1\}$ to the raw projection data for all channels of each subsequent view to estimate pre-processed projection data for such view. More specifically, linearization vector $\{\hat{I}_1/I_1\}$ is defined for all channels in the base view, and such vector is applied to raw projection data for all channels of each subsequent view in accordance with:

$$\hat{I}_2 = \left\{ \frac{\hat{I}_1}{I_1} \right\} * I_2, \quad (2)$$

where:

$I_2$ is a projection vector of the raw projection data for the subsequent view;

$\hat{I}_2$ is a projection vector of the estimated pre-processed projection data for the subsequent view; and $\{\hat{I}_1/I_1\}$ is the linearization vector.

Figure 3:
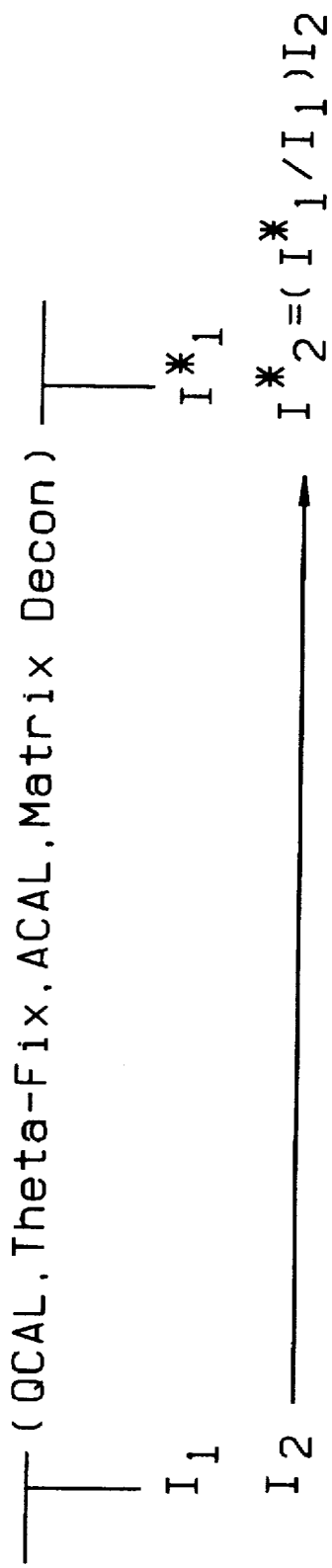
FIG. 3 illustrates a pre-processing time line for pre-processing raw projection data in accordance with the one embodiment of the present invention.

FIG. 3 illustrates a pre-processing time line for pre-processing raw projection data in accordance with the above-described embodiment in connection with pre-processing steps before the −log operation. Specifically, to generate pre-processed projection data $\hat{I}_1$, each of the following pre-processing steps are performed using raw projection data $I_1$: QCAL, Theta-Fix, ACAL (air calibration), and Matrix Deconvolution (or Matrix Decon). Each of these pre-processing steps are well known in the art and, as explained above, require significant computation time and costs. However, the above-described estimation algorithm eliminates each of such processing steps, i.e., pre-processed projection data $\hat{I}_2$ is estimated without performing QCAL, Theta-Fix, ACAL, or Matrix Deconvolution on raw projection data $I_2$.

The above described estimation algorithm reduces pre-processing steps typically required for pre-processing projection data for a plurality of views. Accordingly, image reconstruction time is reduced. Of course, such reduction of pre-processing steps also can be achieved by modifying the above-described algorithm.

For example, rather than fully pre-processing projection data for only one base view, and in accordance with another embodiment of the present invention, raw projection data is fully pre-processed for a first and second base views, $\hat{I}_1$, and $\hat{I}_M$. $\hat{I}_1$ and $\hat{I}_M$ can be any selected views, and there can be a multiplicity of base views $\hat{I}_1$ and $\hat{I}_M$ in any given scan. Pre-processed projection data, $\hat{I}_1$ and $\hat{I}_M$, for the base views is then used to pre-process raw projection data for intermediate views $I_2$–$I_{M-1}$. Particularly, a linear calibration algorithm linearizes such raw projection data in accordance with equation (1). More specifically, pre-precessed projection data for intermediate views $\hat{I}_2$–$\hat{I}_{M-1}$ is determined in accordance with the linear relationship:

$$\hat{I}_j = \frac{\hat{I}_1}{I_M - I_1} * (I_M - I_j) + \quad (3)$$

$$\frac{\hat{I}_M}{I_M - I_1} * (I_j - I_1) \text{ where } j = 2, \ldots, M-1$$

As with the linear calibration algorithm described above, equation (3) applies to all channels of detector 18.

The above-described embodiments permit generation of pre-processed projection data without requiring raw projection data to be pre-processed. Accordingly, reconstruction time is reduced. Moreover, it is believed that the above-described algorithms do not significantly degrade image quality and do not require additional costs to implement.

To further inhibit degradation of image quality, new or refreshed base views may be constructed throughout a scan. Particularly, raw projection data is periodically fully pre-processed to generate a new base view which is used in subsequent pre-processing estimation.

In addition, and to improve image quality, a regularization process can be used. Particularly, pre-processed projection data for intermediate views $\hat{I}_2$–$\hat{I}_{M-1}$ may be determined in accordance with:

$$\hat{I}_j = \frac{1}{2} * \{\hat{I}_1 + \hat{I}_M\} \text{ if } \left|\frac{\hat{I}_1 - \hat{I}_M}{\hat{I}_1}\right| \leq T, \text{ and} \quad (4)$$

$$\hat{I}_j = \left\{\frac{\hat{I}_1}{I_M - I_1}\right\} * (I_M - I_j) + \left\{\frac{\hat{I}_M}{I_M - I_1}\right\} * (I_j - I_1) \text{ else},$$

where j=2, ... M−1, and T is a threshold value. Threshold value T may be pre-selected and stored, for example, in mass storage 38. In one embodiment of the present invention, threshold value T is 0.05.

Alternatively, pre-processed projection data for intermediate views $\hat{I}_2$–$\hat{I}_{M-1}$ may be determined in accordance with:

$$\hat{I}_j = \frac{I_j}{2} * \left\{\left[\frac{\hat{I}_1}{I_1}\right] + \left[\frac{\hat{I}_M}{I_M}\right]\right\} \text{ if } \left|\frac{\hat{I}_1 - \hat{I}_M}{\hat{I}_1}\right| \leq T, \text{ and} \quad (5)$$

$$\hat{I}_j = \left\{\frac{\hat{I}_1}{I_M - I_1}\right\} * (I_M - I_j) + \left\{\frac{\hat{I}_M}{I_M - I_1}\right\} * (I_j - I_1) \text{ else},$$

where j=2, ... M−1, and T is the threshold value.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, the above-described algorithm was applied in connection with pre-processing steps before the −log operation. Such algorithm also may be applied in connection with pre-processing steps after the −log operation (e.g., in connection with z-slope correction). In addition, the CT system described herein is a "third generation" system in which both the x-ray source and detector rotate with the gantry. Many other CT systems including "fourth generation" systems wherein the detector is a full-ring stationary detector and only the x-ray source rotates with the gantry, may be used. Similarly, the above-described embodiments may be used with multi-slice systems. Accordingly, the spirit and scope of the invention are to be limited only by the terms of the appended claims.

What is claimed is:

1. A method for reconstructing an image of an object in a CT system using raw projection data acquired in a scan, the CT system having an x-ray source for projecting x-rays and a detector array, said detector array comprising a plurality of detectors, said method comprising the steps of:

pre-processing the raw projection data for at least one base view to generate pre-processed projection data for the base view; and estimating pre-processed data for a subsequent view utilizing at least a portion of the pre-processed projection data for the base view.

2. A method in accordance with claim 1 wherein estimating pre-processed projection data for the subsequent view comprises the step of applying a linear calibration algorithm to the raw projection data for the subsequent view.

3. A method in accordance with claim 2 wherein the pre-processed projection data for the subsequent view is estimated in accordance with:

$$\hat{I}_2 = \frac{\hat{I}_1}{I_1} * I_2,$$

where:

$\hat{I}_1$ is a projection value of the pre-processed projection data for the base view;

$I_1$ is a projection value of the raw projection data for the base view;

$\hat{I}_2$ is a projection value of the pre-processed projection data for the subsequent view; and $I_2$ is a projection value of the raw projection data for the subsequent view.

4. A method in accordance with claim 1 wherein estimating pre-processed projection data for the subsequent view comprises the step of applying a linearization vector to the raw projection data for the subsequent view.

5. A method in accordance with claim 4 wherein the linearization vector is:

$\{\hat{I}_1/I_1\}$, where:

$\hat{I}_1$ is a projection vector of the pre-processed projection data for the base view; and $I_1$ is a projection vector of the raw projection data for the base view.

6. A method for reconstructing an image of an object in a CT system using raw projection data acquired in a scan, the CT system having an x-ray source for projecting x-rays and a detector array, said detector array comprising a plurality of detectors, said method comprising the steps of:

pre-processing the raw projection data for two base views to generate pre-processed projection data for the two base views; and estimating pre-processed data for an intermediate view between the two base views utilizing at least a portion of the pre-processed projection data for the two base views.

7. A method in accordance with claim 6 wherein estimating pre-processed projection data for the intermediate view comprises the step of applying a linear calibration algorithm to the raw projection data for the intermediate view.

8. A method in accordance with claim 7 wherein at least a portion of the pre-processed projection data for the intermediate view is estimated in accordance with:

$$\hat{I}_j = \frac{\hat{I}_1}{I_M - I_1} * (I_M - I_j) +$$

$$\frac{\hat{I}_M}{I_M - I_1} * (I_j - I_1) \text{ where } j = 2, \ldots, M-1$$

where:

$\hat{I}_1$ is a projection value of the pre-processed projection data for one base view;

$I_1$ is a projection value of the raw projection data for the one base view;

$\hat{I}_M$ is a projection value of pre-processed projection data for the other base view;

$I_M$ is a projection value of the raw projection data for the other base view;

$\hat{I}_j$ is a projection value of the pre-processed projection data for the intermediate view; and $I_j$ is a projection value of the raw projection data for the intermediate view.

9. A method in accordance with claim 8 wherein the pre-processed projection data for the intermediate view is estimated in accordance with:

$$\hat{I}_j = \frac{1}{2} * \{\hat{I}_1 + \hat{I}_M\} \text{ if } \left|\frac{\hat{I}_1 - \hat{I}_M}{\hat{I}_1}\right| \leq T, \text{ and}$$

$$\hat{I}_j = \left\{\frac{\hat{I}_1}{I_M - I_1}\right\} * (I_M - I_j) + \left\{\frac{\hat{I}_M}{I_M - I_1}\right\} * (I_j - I_1) \text{ else,}$$

where T is a threshold value.

10. A method in accordance with claim 8 wherein the pre-processed projection data for the intermediate view is estimated in accordance with:

$$\hat{I}_j = \frac{I_j}{2} * \left\{\left[\frac{\hat{I}_1}{I_1}\right] + \left[\frac{\hat{I}_M}{I_M}\right]\right\} \text{ if } \left|\frac{\hat{I}_1 - \hat{I}_M}{\hat{I}_1}\right| \leq T, \text{ and}$$

$$\hat{I}_j = \left\{\frac{\hat{I}_1}{I_M - I_1}\right\} * (I_M - I_j) + \left\{\frac{\hat{I}_M}{I_M - I_1}\right\} * (I_j - I_1) \text{ else,}$$

where T is a threshold value.

11. A system for reconstructing an image of an object using raw projection data acquired in a tomographic scan, said system configured to:

pre-process the raw projection data for at least one base view to generate pre-processed projection data for the base view; and estimate pre-processed data for a subsequent view utilizing at least a portion of the pre-processed projection data for the base view.

12. A system in accordance with claim 11 wherein to estimate pre-processed projection data for the subsequent view, said system is configured to apply a linear calibration algorithm to the raw projection data for the subsequent view.

13. A system in accordance with claim 12 wherein the pre-processed projection data for the subsequent view is estimated in accordance with:

$$\hat{I}_2 = \frac{\hat{I}_1}{I_1} * I_2,$$

where:

$\hat{I}_1$ is a projection value of the pre-processed projection data for the base view;

$I_1$ is a projection value of the raw projection data for the base view;

$\hat{I}_2$ is a projection value of the pre-processed projection data for the subsequent view; and $I_2$ is a projection value of the raw projection data for the subsequent view.

14. A system in accordance with claim 11 wherein to estimate pre-processed projection data for the subsequent view, said system is configured to apply a linearization vector to the raw projection data for the subsequent view.

15. A system in accordance with claim 14 wherein the linearization vector is:

$$\{\hat{I}_1/I_1\},$$

where:

$\hat{I}_1$ is a projection vector of the pre-processed projection data for the base view; and $I_1$ is a projection vector of the raw projection data for the base view.

16. A system in accordance with claim 11 further configured to pre-process the raw projection data for two base views to generate pre-processed projection data for the two base views, and wherein the subsequent view is intermediate the two base views.

17. A system in accordance with claim 16 wherein estimating pre-processed projection data for the subsequent view comprises the step of applying a linear calibration algorithm to the raw projection data for the subsequent view.

18. A system in accordance with claim 17 wherein at least a portion of the pre-processed projection data for the subsequent view is estimated in accordance with:

$$\hat{I}_j = \frac{\hat{I}_1}{I_M - I_1} * (I_M - I_1) +$$

$$\frac{\hat{I}_M}{I_M - I_j} * (I_j - I_1) \text{ where } j = 2, \ldots, M-1$$

where:

$\hat{I}_1$ is a projection value of the pre-processed projection data for one base view;

$I_1$ is a projection value of the raw projection data for the one base view;

$\hat{I}_M$ is a projection value of pre-processed projection data for the other base view;

$I_M$ is a projection value of the raw projection data for the other base view;

$\hat{I}_j$ is a projection value of the pre-processed projection data for the subsequent view; and $I_j$ is a projection value of the raw projection data for the subsequent view.

19. A system in accordance with claim 18 wherein the pre-processed projection data for the intermediate view is estimated in accordance with:

$$\hat{I}_j = \frac{1}{2} * \{\hat{I}_1 + \hat{I}_M\} \text{ if } \left|\frac{\hat{I}_1 - \hat{I}_M}{I_1}\right| \leq T, \text{ and}$$

$$\hat{I}_j = \left\{\frac{\hat{I}_1}{I_M - I_1}\right\} * (I_M - I_j) + \left\{\frac{\hat{I}_M}{I_M - I_1}\right\} * (I_j - I_1) \text{ else,}$$

where T is a threshold value.

20. A system in accordance with claim 18 wherein the pre-processed projection data for the intermediate view is estimated in accordance with:

$$\hat{I}_j = \frac{I_j}{2} * \left\{\left[\frac{\hat{I}_1}{I_1}\right] + \left[\frac{\hat{I}_M}{I_M}\right]\right\} \text{ if } \left|\frac{\hat{I}_1 - \hat{I}_M}{I_1}\right| \leq T, \text{ and}$$

$$\hat{I}_j = \left\{\frac{\hat{I}_1}{I_M - I_1}\right\} * (I_M - I_j) + \left\{\frac{\hat{I}_M}{I_M - I_1}\right\} * (I_j - I_1) \text{ else,}$$

where T is a threshold value.

* * * * *